Oct. 30, 1962 R. W. HALBACH 3,061,441
TOASTER BISCUIT AND METHOD OF MAKING SAME
Filed May 9, 1960

INVENTOR:
ROBERT W. HALBACH,
BY Kingsland, Rogers & Ezell
ATTORNEYS

United States Patent Office 3,061,441
Patented Oct. 30, 1962

3,061,441
TOASTER BISCUIT AND METHOD OF MAKING SAME
Robert W. Halbach, Quincy, Ill., assignor to Pepperidge Farm Incorporated, Norwalk, Conn., a corporation of Connecticut
Filed May 9, 1960, Ser. No. 27,572
2 Claims. (Cl. 99—90)

The present invention relates generally to partially prepared foods, and more particularly to a novel biscuit prepared and formed for completion and browning in a toaster, and to a novel method of making the same.

There has long existed the need for a biscuit product adapted for use with an electric toaster found in every household today where electric power is available. Biscuits are highly desirable for breakfast, yet many, particularly men who prepare their own breakfast, do not care to resort to the oven in preparation of the bread. Additionally, biscuits even protected by suitable dish or cloth cover become cold before the last one is consumed. The present invention supplies this long-felt need.

Therefore, an object of the present invention is to provide a novel partially prebaked biscuit unit which can be toasted and brought to the final stage for consumption by an electric toaster, or the like, and a novel method of making the same.

In brief, the present biscuit unit comprises a square, rectangular, or other shaped mass of partially prebaked biscuit dough which is substantially three-quarters of an inch in thickness. The biscuit unit is scored to provide several biscuits, preferably four. In one commercial package, there are three biscuit units stacked or in a single layer, each scored to provide four biscuits. In preparation of the biscuit unit, biscuit dough is rolled to a thickness of substantially three-eighths of an inch and cut to the desired form, being scored as desired. The biscuit unit is partially prebaked in which the thickness substantially doubles to about three-quarters of an inch. Several biscuit units are cellophane wrapped and are ready for sale and the toaster.

Therefore, another object is to provide a novel biscuit unit which can be sold in packages in the store and subsequently placed in an electric toaster, or the like, for completion of baking and browning, as desired.

Another object is to provide a novel partially prebaked biscuit package.

Another object is to provide a novel method of making biscuit units suitable for direct disposition in a toaster for completion of baking and browning and consumption.

Another object is to provide a novel biscuit which involves minimum packaging and shelf space requirements, and which satisfies the breakfast need for those desiring biscuits instead of toast without the use of the oven in the preparation.

The foregoing and other objects and advantages are apparent from the following description taken with the accompanying drawing, in which.

Figure 1:
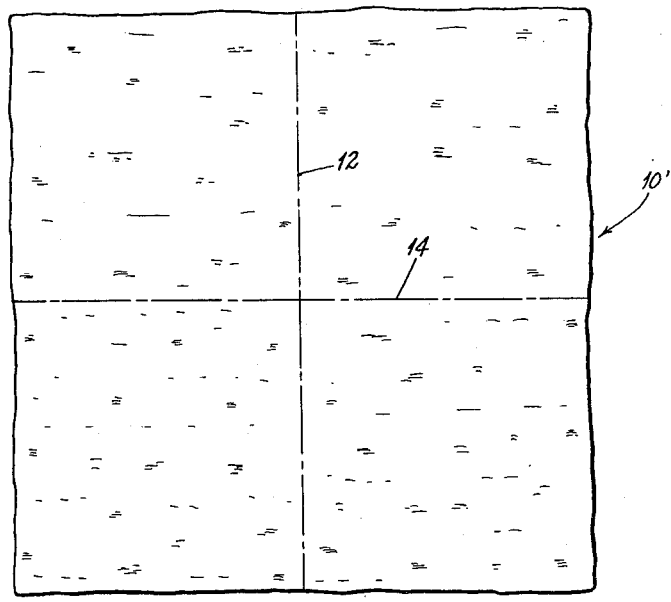
FIGURE 1 is a plan view of a rectangular mass of biscuit dough of thickness of substantially three-eighths of an inch and scored to provide four biscuits.
Figure 2:
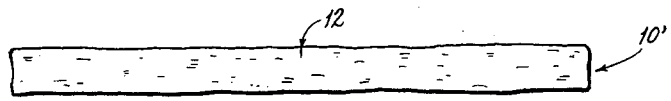
FIGURE 2 is a side elevational view thereof.
Figure 3:
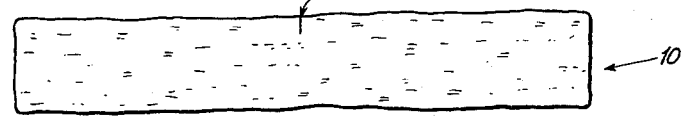
FIGURE 3 is a view similar to FIGURE 2, illustrating the relative thickness of the novel biscuit unit after partially prebaking the formed biscuit dough.
Figure 4:
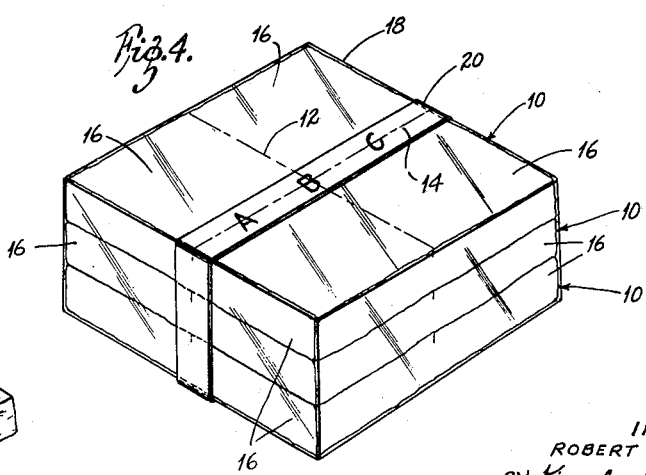
FIGURE 4 is an isometric view of a cellophane wrapped package of three biscuit units as sold to the consumer.
Figure 5:
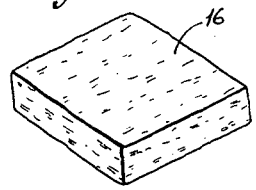
FIGURE 5 is an isometric view of an individual biscuit.

Referring to the drawing more particularly by reference numerals, 10 indicates generally a biscuit unit made in accordance with the teachings of the present invention. The biscuit unit 10 is scored at 12 and 14 to provide four biscuits 16. In FIGURE 4, three biscuit units 10 are illustrated as wrapped in cellophane 18, a merchandising label 20 being wrapped about the package. The biscuits 10 may be wrapped as a single layer, if desired.

In the preparation of the biscuit unit 10, suitable biscuit dough is rolled and a dough square 10' of the desired configuration and a thickness of substantially three-eighths of an inch is provided. The dough square 10' is scored at 12 and 14. The dough square 10' is partially pre-baked in an oven during which period the dough swells to a thickness of substantially three-quarters of an inch, a convenient thickness for use in an average electric toaster of the pop-up type. This may be accomplished by baking the dough square 10' for from eight to twelve minutes in a 450° F. oven. The dough square 10' is removed from the oven as a biscuit unit 10 before being completely baked and before browning. The biscuit unit 10 is then ready for packaging as desired and by any preferred method.

Any suitable biscuit dough recipe can be used. A baking powder biscuit recipe, which has been employed successfully, for one batch comprises two cups of bread flour, four teaspoons baking powder, one teaspoon salt, two tablespoons shortening, and three-fourths to one cup of milk. The ingredients are dry-mixed; shortening is worked in; liquid is added gradually; and the dough mass mixed to a soft dough. The mass is rolled lightly to three-eighths of an inch thickness. Manifestly, other recipes may be employed, depending upon many factors. The essence of the invention comprises the provision ultimately of a biscuit unit, or other food material, in partially pre-baked state suitable for completion in an electric toaster of the slotted pop-up or push-up type.

It is apparent that there has been provided a novel biscuit unit and method of making the same which fulfill the objects and advantages sought.

It is to be understood that the foregoing description and the accompanying drawings have been given by way of illustration and example. It is also to be understood that changes in form of the several parts, substitution of equivalent elements or steps, and rearrangement of parts or steps, which will be readily apparent to one skilled in the art, are contemplated as within the scope of the present invention, which is limited only by the claims which follow.

What is claimed is:
1. A method of preparing biscuit units suitable for browning to completion in a slotted electric toaster which comprises preparing a biscuit dough mass, rolling the mass to the desired thickness, cutting the mass to a predetermined outline, prebaking the cut mass for a predetermined period of time to a degree short of completion, and packaging the partially prebaked biscuit units for sale.
2. A biscuit unit prepared in accordance with the method set forth in claim 1.

References Cited in the file of this patent
UNITED STATES PATENTS
2,489,726   Salerno _____ Nov. 29, 1949
2,549,595   Gregor _____ Apr. 17, 1951

OTHER REFERENCES
Quick Frozen Foods, April 1951, page 21.